United States Patent [19]

Hutchin

[11] Patent Number: 4,499,492
[45] Date of Patent: Feb. 12, 1985

[54] METHOD AND APPARATUS FOR THREE FRAME RANGE IMAGING

[75] Inventor: Richard A. Hutchin, Marlboro, Mass.

[73] Assignee: Novon, Inc., Swampscott, Mass.

[21] Appl. No.: 464,600

[22] Filed: Feb. 7, 1983

Related U.S. Application Data

[63] Continuation-in-part of Ser. No. 409,344, Aug. 18, 1982.

[51] Int. Cl.³ .............................................. H04N 7/18
[52] U.S. Cl. .................................... 358/107; 356/4; 356/4.5; 250/236
[58] Field of Search ............... 358/107; 356/151, 152, 356/374, 3, 4, 4.5; 250/236, 237

[56] References Cited

U.S. PATENT DOCUMENTS

| | | | |
|---|---|---|---|
| 3,348,050 | 10/1967 | Bez | 356/4 |
| 3,369,445 | 2/1968 | Kohl | 356/3 |
| 3,485,560 | 12/1969 | Gamertsfelder | 356/151 |
| 3,649,754 | 3/1972 | Macovski | 358/107 |
| 3,799,675 | 3/1974 | Johnson et al. | 356/152 |
| 3,866,052 | 2/1975 | DiMatteo et al. | 250/558 |
| 3,879,133 | 4/1975 | Mathieu | 358/107 |
| 3,943,278 | 3/1976 | Ramsey, Jr. | 358/107 |
| 3,944,821 | 3/1976 | Pierrat | 356/151 |
| 4,145,991 | 3/1979 | DiMatteo et al. | 356/375 |
| 4,159,522 | 6/1979 | Zanoni | 358/107 |
| 4,240,745 | 12/1980 | Green | 358/107 |
| 4,254,433 | 3/1981 | Dewar, Jr. et al. | 358/107 |
| 4,259,017 | 3/1981 | Ross et al. | 356/375 |
| 4,410,787 | 10/1983 | Kremers et al. | 358/107 |

OTHER PUBLICATIONS

Nevatia et al., "Structured Descriptions of Complex Objects", *Proc. 3rd Int. Joint Conf. Artificial Intelligence*, Aug. 1973.
Shirai et al., "Recognition of Polyhedrons with a Range Finder", *Proc. 2nd Int. Joint Conf. Artificial Intelligence*, Sep. 1971.
Rocker et al., "Methods for Analyzing Three Dimensional Scenes", *Proc. 4th Int. Joint Conf. Artificial Intelligence*, Sep. 1975.

*Primary Examiner*—Howard W. Britton
*Assistant Examiner*—Edward L. Coles
*Attorney, Agent, or Firm*—Cushman, Darby & Cushman

[57] ABSTRACT

A range imaging system in which a periodic pattern is projected onto the scene to be imaged. Three frames of intensity values are collected as the pattern shifts 120°. The phase by which variations in range cause portions of the pattern to shift are determined from the three frames of data as being proportional to range. To generate the phase information, the intensity value for each pixel in the third frame is subtracted from intensity values of the same pixel of the first and second frames. The arc tangent of a function of these difference values represents the phase shift, and thus range.

40 Claims, 10 Drawing Figures

METHOD AND APPARATUS FOR THREE FRAME RANGE IMAGING

RELATED APPLICATIONS

This is a continuation-in-part application of U.S. Ser. No. 409,344 filed Aug. 18, 1982 (hereinafter referred to as "the parent application"), the contents of which are incorporated herein by reference.

BACKGROUND OF THE INVENTION

This invention relates to the imaging arts, and more particularly, to range imaging employing parallax.

With the increasing utilization of robots in industry and the more sophisticated tasks being performed by robots, a strong need has been felt for improved visual sensors. Initial attempts to provide robots with vision imitated the human visual process, employing intensity imaging. While steady progress has been made, it has been slow and requires a basic theoretical breakthrough before this type of vision reaches its full potential in robotics. The current state-of-the art is just entering real-time gray scale processing for robots and has been only marginally useful in military reconnaissance and industry.

To overcome the problems inherent with intensity imaging or the like, range imaging has been employed. Although a number of different range imaging techniques has been proposed, employing parallax appears to be the most promising.

A number of parallax range imaging systems are known in the art. For example, in U.S. Pat. No. 3,866,052 to DiMatteo et al, the range between a predetermined point and a field including a scene to be imaged is divided into a series of segments. Four different light patterns are projected onto the field sequentially and intensity data reflected from the scene is obtained. This intensity data is then combined to determine in which of the segments each of the elements of the scene lies. A problem with this system is that resolution is limited to the size of the segments.

U.S. Pat. No. 4,145,991 to DiMatteo et al teaches a range imaging system with improved resolution. In this patent, as in DiMatteo '052, the scene is subdivided into a number of segments. Resolution is improved by overlapping the subdivided segments so that a portion of one segment overlaps a portion of a neighboring segment. Resolution is maximized when the number of segments is increased.

In this patent, the scene is illuminated with a number of different modulation patterns and reflected intensity information is employed to determine the range of points in the scene. According to this patent, the resolution that may be obtained is related to the number of different modulation patterns projected onto the scene. Thus, this patent is similar to the DiMatteo et al '952 patent in that range is divided into a number of segments and resolution is limited to determining in which segment a point of the scene lies. This patent does provide the additional teaching that resolution can be improved by decreasing the size of the segments, which in turn is accomplished by increasing the number of modulation patterns projected onto the scene.

U.S. Pat. No. 4,259,017 to Ross et al and the parent application both teach further improvements on parallax based range imaging techniques. Specifically, these teach range imaging techniques in which the range can be determined continuously. Instead of employing illumination patterns which are binary (i.e., either transmissive or opaque), sinusoidally varying illumination patterns are employed. Four frames of reflected intensity data are collected to produce a range image.

The techniques taught by Ross et al and the parent application are greatly improved over the prior art with respect to resolution. However, certain problems do exist. Specifically, four time spaced frames of intensity data must be collected. The more frames of intensity data that must be collected, obviously the more time must be consumed to produce one frame of range data. The necessity of collecting four frames of data may cause problems if a fast moving scene is being monitored and real-time processing is required.

Also, in Ross et al and certain embodiments of the parent application, the four frames of data are stored in memory. Obviously, the more frames of data that must be stored, the larger the memory must be, increasing the cost of the apparatus.

Also, the parent application suggests that a square wave Ronchi pattern may be employed to approximate a sinusoidal pattern. When projecting a moving Ronchi pattern, the third harmonic is the most serious degrading factor in measurement accuracy. To improve this situation, the parent application suggests defocusing the Ronchi pattern. However, the problem with the third harmonic still exists.

SUMMARY OF THE INVENTION

The present invention overcomes the problems identified above by providing a range imaging technique which produces continuous (as opposed to segmented) range data from only three frames of reflected intensity information.

In the present invention, a moving periodic pattern is projected onto a scene. If the scene is flat, the pattern projected thereon will be uniform stripes of bright and dim areas. However, as the scene changes range, the stripes shift in proportion to range when viewed at an angle with respect to the axis of illumination. The temporal phase of the light with respect to the periodic pattern is measured at each pixel as an indication of range.

In the present invention, the reflected intensity information at three points of the temporal cycle are required. By combining the three video frames appropriately, both the effects of background illumination and the effects of varying reflectivity can be eliminated.

Since only three frames of data are required, as compared with four frames of data with the prior art, real-time processing can occur much more quickly in the present invention. Also, the memory requirements for storing the data are reduced. Finally, the accuracy of the range measurements increases with the three frames, as compared to the four frames, since the third harmonic (and all integral multiples) are removed from the temporal signal during the exposure of each frame. With the three frame scheme of the present invention, the third harmonic is eliminated, and defocusing techniques or the like as described in the parent application can be employed to attenuate still higher (and lower intensity) order harmonics.

The periodic pattern may be produced in any of a number of ways. For example, a plate having a transmissiveness which varies periodically can be moved in front of an ordinary lamp. Alternatively, a disk having a transmissiveness which varies circumferentially can be rotated in front of the lamp. These two techniques produce continuously moving patterns. A moving periodic pattern may also be produced by periodically strobing a series of stationary patterns which are phase shifted with respect to each other.

A further advantage results in the present invention from employing a photosensitive device which integrates the light striking it (such as a TV camera). When a square wave Ronchi pattern is projected onto the scene, and an integrating type photosensitive device is employed, if the photosensitive device is permitted to integrate over a portion of the temporal cycle of the pattern movement, the result tends to approximate a sinusoidal pattern. Thus, the high degree of resolution that can be produced from continuous data generated by a sinusoidal pattern may be achieved employing a moving binary pattern. A binary pattern is much easier to accurately produce than a sinusoidal pattern.

Since phase change is being detected, the range data has an ambiguity. If two points are a certain distance apart in range, their periodic patterns appear to be shifted by exactly one full cycle. This ambiguity problem is resolved in the present invention by employing more than one periodic pattern in the illuminator or employing illuminators with different periodic patterns. The patterns have different spatial frequencies. The high frequency pattern is employed for accuracy, and the low frequency pattern is employed for range.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawing, of which.

DETAILED DESCRIPTION OF THE PRESENTLY PREFERRED EXEMPLARY EMBODIMENTS

Figure 1:
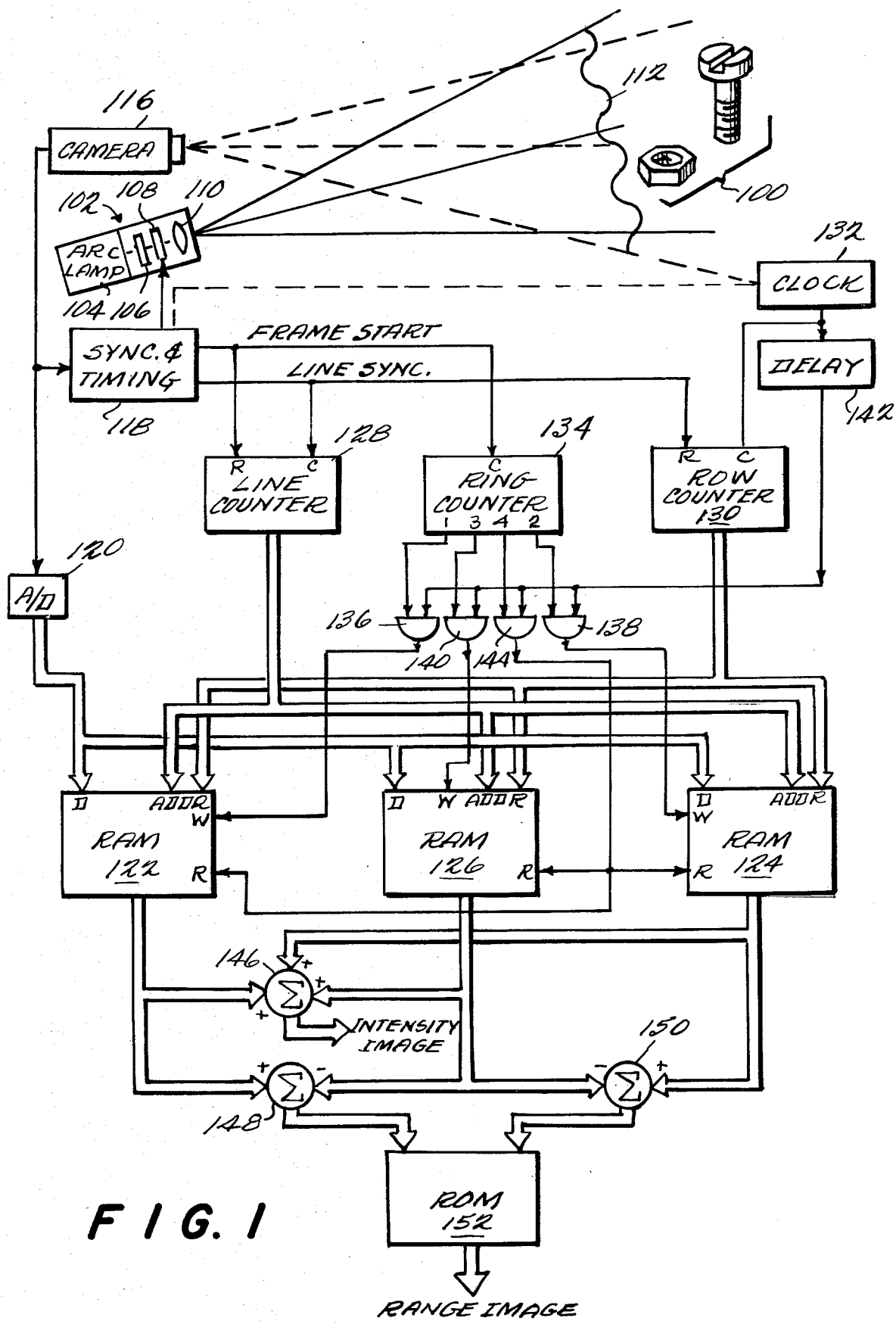
FIG. 1 is a circuit diagram of one embodiment of the present invention.

FIG. 1 illustrates a system according to the present invention for generating an image of scene 100. The scene is illuminated by illuminator 102 which includes arc lamp 104, heat filter 106, pattern generator 108 and lens 110. Pattern generator 108 produces periodic pattern 112 on scene 100. If all areas of scene 100 were the same distance from illuminator 102, scene 100 would be illuminated with uniform stripes of bright and dim areas. However, since the objects in scene 100 differ in range from illuminator 102 and the scene is viewed from an angle 114, the regions of darkness and lightness bend, and it is this bending which is employed to determine the range of objects in scene 100.

In fact, pattern generator 108 includes means for moving the pattern across scene 100. The phase shift of the regions of darkness and lightness with respect to the movement of the pattern is actually measured. Scene 100, as illuminated by illuminator 102, is viewed by electronic camera 116. The system does not require a high performance camera. While field distortion will be interpreted as small shape distortions, these can be calibrated out easily if required. A charge coupled device (CCD) camera would give the best scan stability and signal-to-noise ratio.

The output of camera 116 is applied to both synchronization and timing circuit 118 and analog-to-digital converter 120. Synchronization and timing circuit 118 extracts from the camera signal frame start and line synchronization signals. The video data contained in the signal from camera 116 is converted into a digital quantity by means of analog-to-digital converter 120 and applied to the data inputs of random access memories (RAMs) 122–126.

To control the address into which the data is written, line counter 128 and row counter 130 are provided. Line counter 128 counts the number of lines that have been scanned in each frame. Thus, line counter 128 is incremented by the line synchronization signal from synchronization and timing circuit 118 and reset by the frame start signal also from synchronization and timing circuit 118. Row counter 130 determines the pixel which camera 116 is scanning across the line. Thus, row counter 130 is incremented by clock 132 and reset by the line synchronization signal from synchronization and timing circuit 118. Obviously, clock 132 must be coordinated with camera 116 so that the frequency of the clock matches the speed at which camera 116 sweeps across the line. This coordination can be performed either by carefully controlling the frequency of clock 132 or by synchronizing clock 132 with synchronization and timing circuit 118 as indicated by dotted line in FIG. 1.

The output of line counter 128 forms the most significant bits of the address input of RAMs 122–126 and the output of row counter 130 forms the least significant bits of the address input.

In the present invention, range data are generated from three frames of intensity data. Between each of the three frames, pattern 112 moves one-third of a cycle. After the three frames of data have been collected, the intensity value of each pixel in the third frame is subtracted from the intensity values of the corresponding pixels in both the first frame and the second frame to produce two frames of difference data. As a result of the subtractions, any effects of background illumination are cancelled out.

Furthermore, it should be noted that the moving pattern 112 shifts one-third cycle between the first and second frames. Accordingly, after the subtractions have taken place, what is left are two frames of data related to each other by a one-third cycle phase shift of moving pattern 112. If one set of data is plotted along the X axis and the other set of data is plotted along the Y axis, a vector is defined whose angle is uniquely related to the phase shift of moving pattern 112, and thus to the range of each particular pixel through a geometrically determined constant.

For example, if pattern 112 were actually sinusoidal, the intensity data for the three frames can be considered as:

Frame 1: A+B sin (θ−120°)
Frame 2: A+B sin θ
Frame 3: A+B sin (θ+120°), where θ is the amount of phase shift caused by a variation in range. When frame 3 is subtracted from frames 1 and 2, two frames of difference values result:

$$V1 = B[\sin(\theta - 120°) - \sin(\theta + 120°)]$$

$$V2 = B[\sin\theta - \sin(\theta + 120°)]$$

where θ is the phase shift of the pattern due to varying intensity. Solving these two equations for θ:

$$\theta = \arctan\left[(V_1 - 2V_2)/\sqrt{3}\,(V_1)\right]$$

As indicated above, the phase θ is directly related to the range of the particular pixel through a geometrically determined constant.

Also, it should be clear that if the data of the three frames are summed, the resulting frame of values represents an intensity image.

To perform the operations referred to above, ring counter 134 has four output terminals which sequentially and individually become high in response to frame start signals applied to a clock input. Thus, at the beginning of each frame, the next output terminal of the ring counter becomes high. The first three outputs of ring counter 134 are applied to AND gates 136–140, respectively. The other inputs of AND gates 136–140 are responsive to delay circuit 142 which produces a signal having the same frequency as the output of clock 132, but delayed in phase. The outputs of AND gates 136–140 are applied to the write control inputs of RAMs 122, 124 and 126, respectively.

The fourth output terminal of ring counter 134 is supplied to AND gate 144. The other input of AND gate 144 also receives the signal from delay circuit 142. The output of AND gate 144 is applied to the read terminals of RAMs 122–126.

The outputs of RAMs 122 through 126 are added together by means of summer 146 to produce an intensity image. The output of RAM 126 is subtracted from the outputs of both RAM 122 and RAM 124 by means of summers 148 and 150, respectively, to produce values $V_1$ and $V_2$.

The output of summers 148 and 150 (values $V_1$ and $V_2$) are applied to the address inputs of ROM 152. ROM 152 outputs a value which represents the arc tangent function presented above. Thus, each conceivable $V_1$, $V_2$ combination defines an address in ROM 152 at which is stored a value related to arc tan$[(V_1-2V_2)/\sqrt{3}\,(V_1)]$. Obviously, a calculating device may be employed instead of ROM 158.

Figure 2:
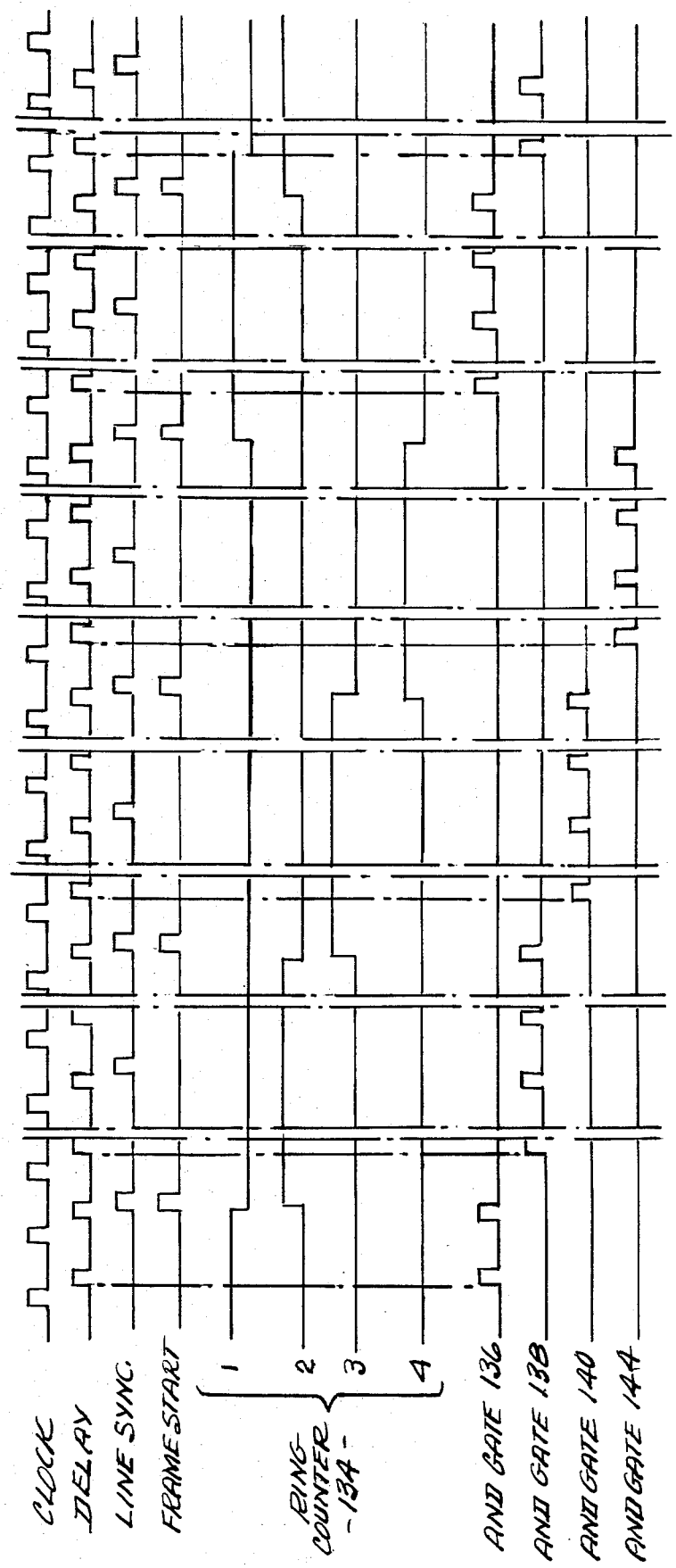
FIG. 2 is a timing diagram for the circuit of FIG. 1.

FIG. 2 is a timing diagram illustrating the operation of FIG. 1. Suppose the first output terminal of ring counter 134 is high. This causes data to be written into RAM 122.

At the beginning of the first frame, a frame start signal has reset line counter 128 and a line synchronization signal has reset row counter 130. Thereafter, clock 132 increments row counter 130 to serially address different memory locations corresponding to the pixels across the first line. At the end of the first line, the line synchronization signal causes row counter 130 to be reset and line counter 128 to be incremented so that memory locations corresponding to the second row of pixels are sequentially addressed as row counter 130 is incremented by clock 132. This process continues until the entire first frame has been scanned.

As counters 128 and 130 increment the address signal applied to RAMs 122–126, camera 116 is scanning through the frame. For each pixel, data is applied to the data input of RAMs 122–126. As soon as the address has stabilized on the output lines of counters 128 and 130, delay circuit 142 produces a pulse which passes through AND gate 136 to cause RAM 122 to write at the appropriate address the data provided at the input terminal of RAM 122. The address signal applied to RAM 122 is then incremented and the next piece of data is written into RAM 122. This process continues until the entire frame has been scanned by camera 116.

At the beginning of the next frame, the frame start signal resets line counter 128 and increments ring counter 134 so that the second output terminal becomes high. The line synchronization signal resets row counter 130. Since the second output of ring counter 134 is high, AND gate 138 passes pulses from delay circuit 142 to the write input of RAM 124. As a result, data from analog-to-digital converter 120 is written into RAM 124 in the same manner that the first frame of data was written into RAM 122.

In a similar manner, RAM 126 is loaded with data from the third frame. At the end of this loading stage, RAMs 122–126 each contains the intensity of values for one frame. Between the loading of sequential memories, moving pattern 112 shifts one-third of a cycle.

After the third frame has been loaded, the next frame start signal causes the fourth output terminal of ring counter 134 to become high. As a result, pulses from delay circuit 142 are applied to the read control inputs of RAMs 122–126 through AND gate 144. At the same time, counters 128 and 130 continue to be clocked and reset in the manner described above so that the intensity values for each pixel in RAMs 122–126 are incrementally accessed. Since the output of AND gate 144 places RAMs 122–126 in a reading mode, the intensity values are outputted from RAMs 122–126. The data from the first frame in RAM 122 is applied to adding inputs of summers 146 and 148. The data from the second frame in RAM 124 is applied to an adding input of summer 146 and an adding input of summer 150. The intensity values for the pixels of the third frame stored in RAM 126 are applied to an adding input of summer 146 and to subtracting inputs of summers 148 and 150.

The differences generated by summers 148 and 150 are applied to ROM 152 as an address. The output of summer 146 represents a sequence of the sums of the intensity values in corresponding pixels of the first through fourth frames. Thus, the output of summer 141 is an intensity image of scene 100.

The differences generated by summer 148 represent the differences of intensity values of corresponding pixels between the first and third frames. Correspondingly, the differences generated by summer 150 represent the differences in intensity values of corresponding pixels between the second and third frames. ROM 152 is programmed to generate a function related to the arc tangent function developed above. That is, each conceivable combination of values produced by summers 148 and 150 addresses a unique location in ROM 152, in which location is stored the appropriate value of the arc tangent function. As indicated above, this represents a value proportional to the range of the objects in scene 100.

The division associated with the arc tangent function causes all intensity variations related to reflectivity variations to cancel out so that the resulting value is solely related to the change in phase of moving pattern 112 caused by differences in range.

Figure 3:
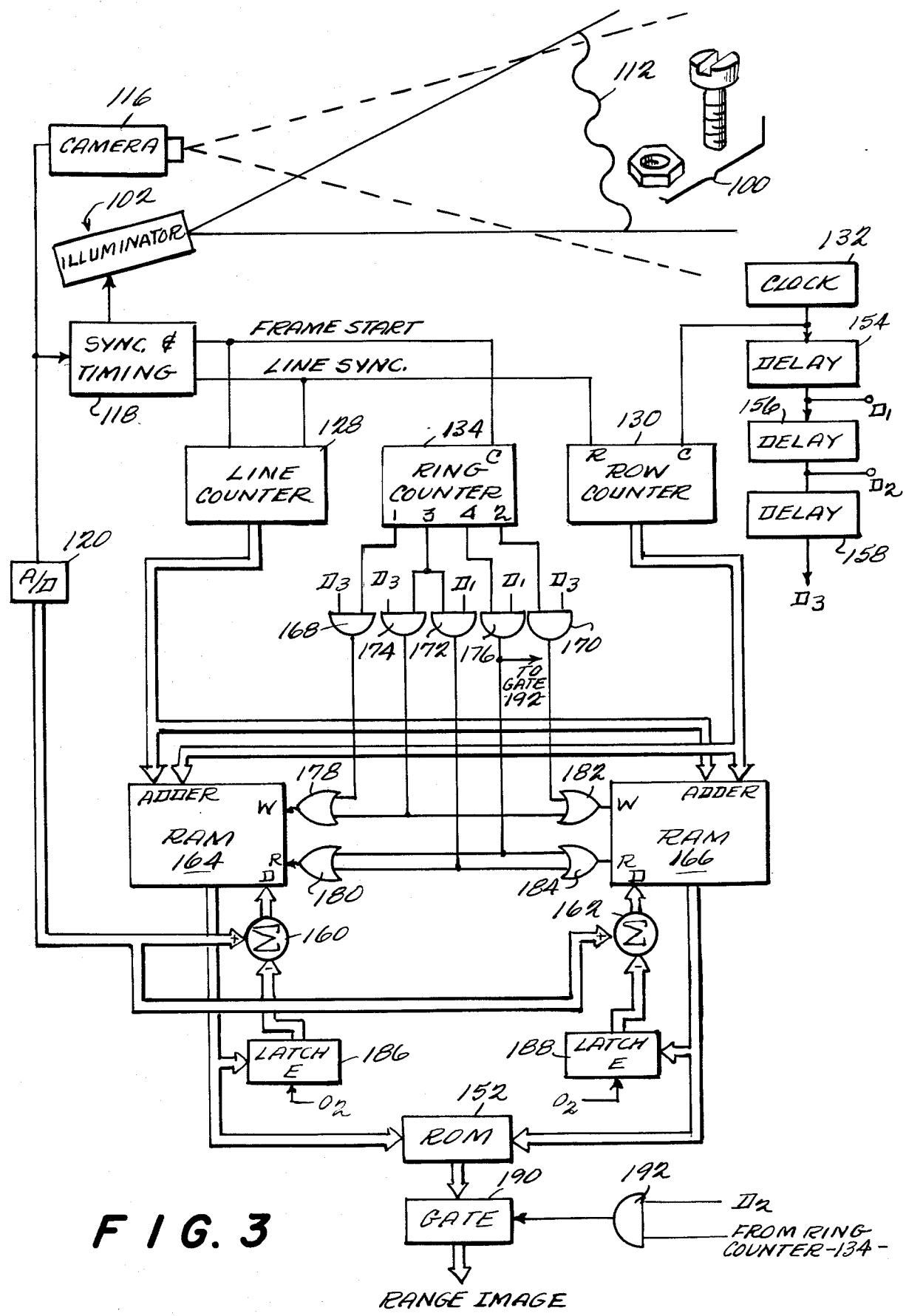
FIG. 3 is a circuit diagram of another embodiment of the present invention.
Figure 4:
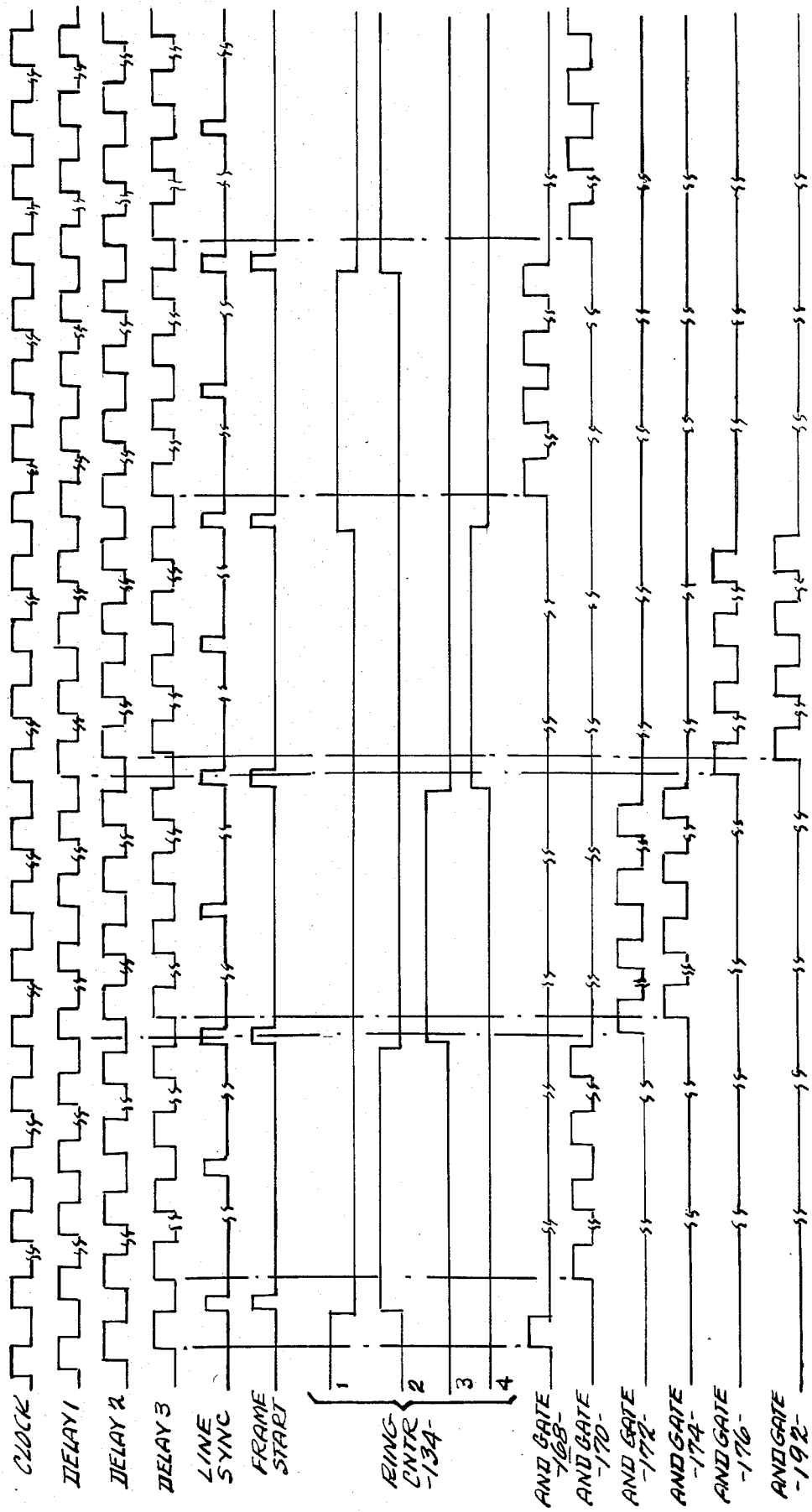
FIG. 4 is a timing diagram of the circuit in FIG. 3.

FIG. 3 illustrates another embodiment of the present invention in which the number of memories needed to store frames of intensity data is reduced. Those elements in FIG. 3 which are identical to elements in FIG. 1 are numbered accordingly. For this embodiment, as illustrated in FIG. 4, not one, but three signals with different delays with respect to the output of clock 132 are required. Thus, delay circuit 154 produces delay signal $D_1$, delay circuit 156 produces delay signal $D_2$ and delay circuit 158 produces delay signal $D_3$. Delay signals $D_1$ through $D_3$ are employed to control the timing of the various events during operation of the circuit.

Instead of being applied directly to the memories, the output of analog-to-digital converter 120 is applied to summers 160 and 162. The outputs of summers 160 and 162 are applied to the data inputs of random access memories 164 and 166, respectively. As with the embodiment in FIG. 1, the addressing of RAMs 164 and 166 is accomplished through counters 128 and 130. Ring counter 134, AND gates 168–176 and OR gates 178–184 control the writing into and reading from RAMs 164 and 166.

The output of RAMs 164 and 166 are applied to latches 186 and 188, respectively. When latches 186 and 188 are enabled, their inputs are stored and supplied to their outputs.

The outputs of RAMs 164 and 166 are also applied to ROM 152. The output of ROM 152 is applied to gate 190 which permits the output of ROM 152 to pass through when a high signal is applied to its controlled terminal. AND gate 192 generates the control signal by the logical combination of the output from terminal 4 of ring counter 134 and delay signal $D_2$.

The operation of FIG. 3 is illustrated by means of the timing chart in FIG. 4. At the very beginning of the first frame, counters 128 and 130 are both reset and the first output terminal of ring counter 134 is high. The output of clock 132 causes row counter 130 to be incremented so that the first address corresponding to the first pixel of the frame is applied to RAMs 164 and 166. After the address has settled, delay signal $D_3$ from delay circuit 158 passes through AND gate 168 and OR gate 178 to the write control input of RAM 164. This causes the intensity value for the first pixel which has passed through summer 160 (the output of latch 186 is 0) to be written at the corresponding address. Clock 132 then causes row counter 130 to be incremented again, so that the address corresponding to the next pixel is applied to RAMs 164 and 166. In this manner, the intensity values for the first row of pixels is stored in RAM 164.

At the end of the row, the line synchronization signal causes row counter 130 to be reset and line counter 128 to be incremented. Afterwards, the next row of intensity values are written into RAM 164. This process continues until an entire frame of values is stored in RAM 164.

With the next frame start signal, counters 128 and 130 are reset and ring counter 134 is incremented so that its second output terminal becomes high. Thereafter, a second frame of intensity values are stored in RAM 166 in that delay signal $D_3$ can pass through AND gate 170 and OR gate 182 to produce write demands for RAM 166. Thus, the second frame of data is stored in RAM 166 in the same manner that the first frame of data was stored in RAM 164.

At the end of the second frame, the frame start signal and the line synchronization signal cause counters 128 and 130 to be reset and ring counter 134 to be incremented so that its third output terminal becomes high. This high signal from ring counter 134 is supplied to AND gates 172 and 174 to permit any signals applied to the other input terminals thereof to pass through. Accordingly, when camera 116 is reading the first pixel of the frame and the corresponding address is applied to RAMs 164 and 166, delay signal $D_1$ passes through AND gate 172 and OR gates 180 and 184 to the read control inputs of RAMs 164 and 166. This causes the intensity value of the first pixel from the first two frames, previously stored in RAMs 164 and 166 to be read out and applied to the input of latches 186 and 188, respectively. With the delay signal $D_2$, these intensity values are stored in latches 186 and 188. Delay signal $D_3$ then passes through AND gate 174 and OR gates 178 and 182 to the write control terminals of RAMs 164 and 166. At this time, the intensity value for the first pixel of frame 3 is applied to the positive inputs of summers 160 and 162 and the intensity values for the first pixel in frames 1 and 2 are applied by latches 186 and 188 to the negative inputs of summers 160 and 162, respectively. Upon the write command, the differences are stored at the appropriate addresses of RAMs 164 and 166.

With the next clock pulse, row counter 130 is incremented so that the address of the next pixel in RAMs 164 and 166 are addressed. After the address signal has settled, a pulse of the $D_1$ signal passes through AND gate 172 and OR gates 180 and 184 to the read control inputs of RAMs 164 and 166. This causes the intensity values of the second pixel of the first two frames to be outputted to latches 186 and 188, respectively. With the pulse of the $D_2$ signal, these values are stored in latches 186 and 188. The next pulse of the $D_3$ signal passes through AND gate 174 and OR gates 178 and 182 to the write control terminals of RAMs 164 and 166 so that RAMs 164 and 166 store the differences between intensity values of the second pixel of the first and third frames and the second and third frames. This process continues until RAMs 164 and 166 store the differences of the intensity values of the pixels for the entire frames.

The next frame start signal and line synchronization signal causes counters 128 and 130 to be reset and ring counter 134 to be incremented so that the fourth output terminal becomes high. This high signal enables AND gate 176. Upon the next clock pulse from clock 132, row counter 130 is incremented so that RAMs 164 and 166 are caused to address the location in which data for the first pixels are stored. As soon as the address signal has settled, a pulse from the $D_1$ signal passes through AND gate 176 and OR gates 180 and 184 to cause RAMs 164 and 166 to read out the difference values stored therein. These values are applied to the address inputs of ROM 152. As before, ROM 152 generates a value related to the arc tangent function developed above. Since the high output signal on the fourth terminal of ring counter 134 also enables AND gate 192, the next pulse of the D$_2$ signal causes gate 190 to pass the output of ROM 152 to its output. This output represents the relative range of the object of scene 100 in the first pixel location.

With the next clock pulse, the second pixel of data is read out of RAMs 164 and 166 and the range is calculated. This process continues until the entire frame has been so processed.

Figure 5:
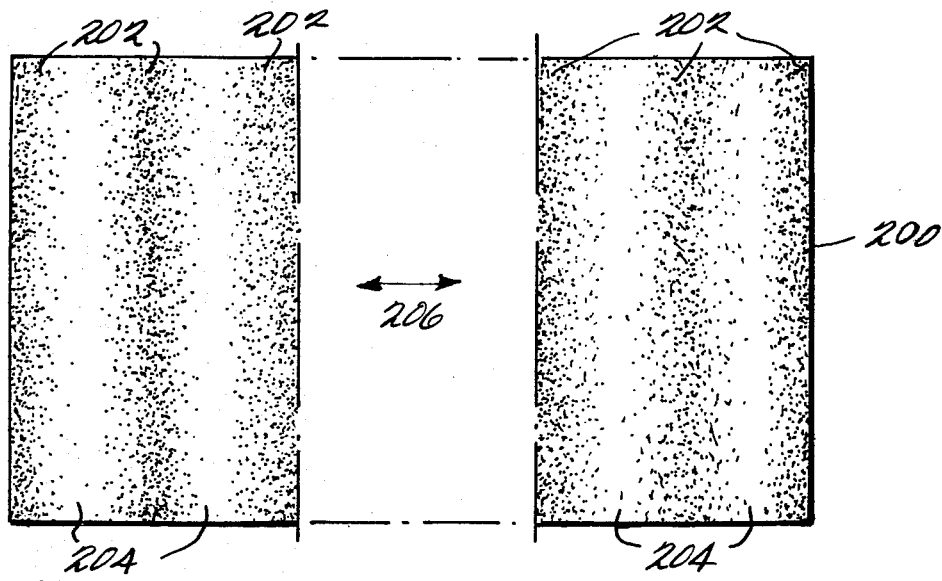
FIG. 5 is a top plan view of a periodic pattern generating plate according to the present invention.

As indicated above, an important aspect of the present invention is the generation of the moving periodic pattern projected onto scene 100. In the preferred embodiment, the pattern is generated by a plate placed in front of arc lamp 104 whose transmissiveness varies along one direction. Thus, as illustrated in FIG. 5, plate 200 of pattern generator 108 has regions 202 of relatively low transmissiveness alternated with regions 204 of high transmissiveness. Such plates are well known in the art as exemplified by the Ross et al patent, supra. The transmissiveness of plate 200 varies sinusoidally along direction 206. Sinusoidal variation is ideal since the arc tangent function is employed to determine the phase shift of the bright and dark regions.

Figure 6:
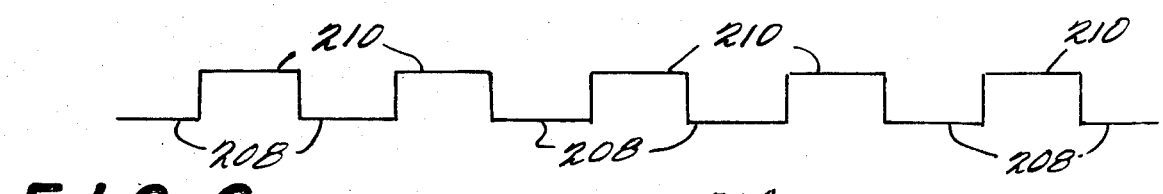
FIG. 6 is a graph of an alternate transmissiveness pattern for the plate of FIG. 5.

However, alternative approximations for a sinusoidal variation may be employed. Thus, FIG. 6 is a chart illustrating the variations of transmissiveness along direction 206 in an alternative embodiment of plate 200. In FIG. 6, regions 208 are much less transmissive than regions 210. If a plate with a transmissiveness which varies in accordance with FIG. 6 is projected slightly out of focus onto scene 100, the resulting pattern of bright and dark areas varies approximately sinusoidally. A plate made in accordance with the transmissiveness function of FIG. 6 may simply consist of a glass plate with either opaque or partially transmissive regions painted thereon.

The use of a square wave Ronchi pattern is particularly advantageous when the photosensitive element employed in the system integrates the light received. A typical TV camera is such a device. In this arrangement, the camera should be allowed to integrate light received over the period of time it takes the projected pattern to move a third of a cycle. If this approach is taken, the resulting signal produced by the photosensitive device closely approximates the signal that would be produced by a moving sinusoidal pattern.

As indicated above, the movement of the pattern generator such as plate 200 must be synchronized with camera 116. Specifically, for each frame scanned by camera 116, plate 200 must shift 120° with respect to the pattern of transmissiveness. Obviously, the pattern in FIG. 5 is greatly enlarged to show more clearly the nature thereof. So that a standard camera may be employed, it is necessary to synchronize the movement of plate 200 with signals produced by camera 116. The synchronization of movement of an object with respect to a series of pulses is well known in the art, and therefore is not described in detail herein. For example, plate 200 may be driven by a loosely coupled stepper motor in a conventional manner.

Figure 7:
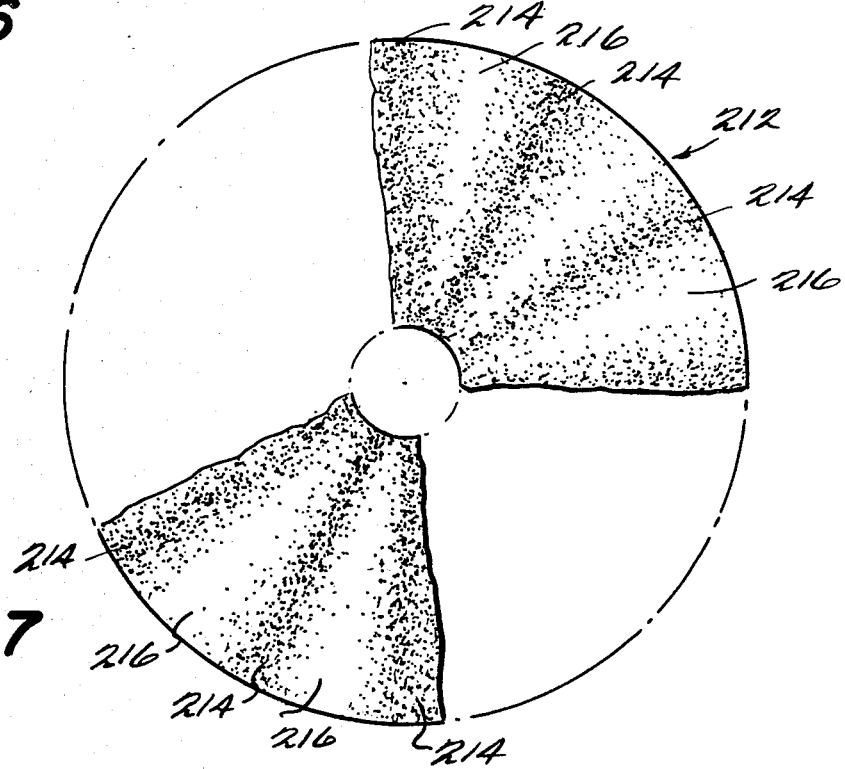
FIG. 7 is a top plan view of a periodic pattern generating disk according to the present invention.

However, a problem exists with respect to the embodiment illustrated in FIG. 5. If a simple plate is employed, eventually the end of the plate is reached and the plate must return to its original position. In order to alleviate this problem, pattern generator 108 may include a disk 212 as illustrated in FIG. 7. Arranged circumferentially about the disk are regions 214 of low transmissiveness and regions 216 of high transmissiveness. The problem with the use of disk 212 is that the pattern projected therethrough will not produce parallel lines due to the radial nature of the pattern on disk 212. However, if disk 212 is made large and the area illuminated by arc lamp 104 is fairly small and at the outer periphery of the disk, the pattern projected will be sufficiently parallel to obtain accurate measurements. Otherwise, it is well within the level of skill in the art to provide correction to the data to overcome this problem. As is well known by those skilled in the art, however, the problem of synchronizing the rotation of disk 212 with camera 116 is much simplified. Again, a loosely coupled stepper motor may be employed.

The two techniques discussed above produce continuously moving patterns. A moving periodic pattern may also be produced by periodically strobing a series of stationary patterns which are phase shifted with respect to each other.

As explained in detail above, the system according to the present invention measures the phase shift of the moving pattern which results from variations in range. If a sudden range variation exists which produces exactly one full cycle of shift in the pattern, the system will not be able to differentiate the shift. Thus, there is an ambiguity in the range data. The continuity of the surfaces must be employed to resolve this ambiguity.

As an example, suppose the system has a one millimeter or better range accuracy with an ambiguity in depth of field of 20 centimeters. Thus, a pixel 20 centimeters behind another pixel will have the same range measurement. In many applications, this ambiguity is of no problem since surfaces can be used to resolve the ambiguity.

However, steps may be taken to widen the depth of field in which there is no ambiguity. As is done in interferometry, the range before ambiguity occurs can be increased by employing more than one period in the patterns projected onto scene 100. The period of the pattern is directly related to the range within which ambiguity does not occur. Thus, a larger period pattern can be employed to locate the range of an object in scene 100 and the smaller period pattern may be employed as "fine tuning" to more precisely identify the location of the object. The application of patterns with different periods may be accomplished either by employing two illuminators or by employing a pattern generator plate which has a transmissiveness pattern that varies at two frequencies simultaneously.

Figure 8:
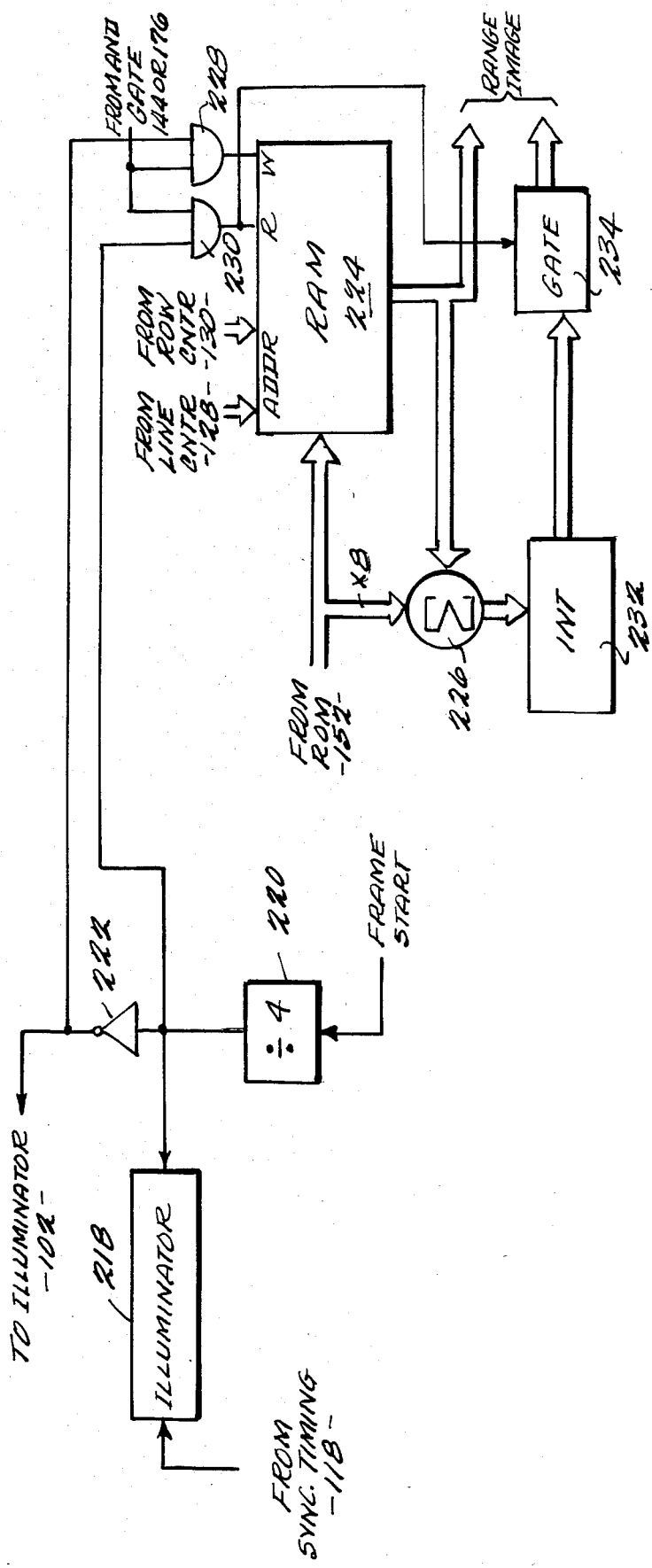
FIG. 8 is a diagram of a circuit to increase the range, in which no ambiguity occurs.

FIG. 8 illustrates a circuit which may be added onto the circuit of either FIG. 1 or FIG. 3 to widen the range in which ambiguity will not occur. In the system illustrated in FIG. 8, a second illuminator 218 is employed. Illuminator 218 produces a pattern whose period is eight times that of illuminator 102. Thus, with this system, the range in which no ambiguity exists increases by a factor of eight. Obviously, by adjusting the ratio of spatial periods between the two illuminators, any improvement in the range of no ambiguity may be obtained. However, the range may not be increased by so large an extent that it is not clear in what portion of the broader range the high frequency data is situated. In general, the periods must be selected so that the coarse accuracy must be better than one-half of a cycle of the fine periodic pattern. Otherwise, ambiguity will exist as to where in the coarse pattern the high accuracy data lies.

Since illuminator 218 produces a spatial pattern which has a period eight times that of illuminator 102, unless a change is made, it will take eight times longer to collect data when illuminator 218 is employed. To overcome this problem, the periodic pattern projected by illuminator 218 moves eight times faster than the pattern projected by illuminator 102. Therefore, the temporal frequency of illuminator 218 is the same as that of illuminator 102.

As indicated above, in this embodiment, illuminator 102 and illuminator 218 operate alternately. Therefore, in addition to the signal from synchronization and timing circuit 118, a signal must also be provided for turning on and off illuminators 102 and 218. To accomplish this, FIG. 8 illustrates divider 220 which is incremented by the frame start signal. This is a divide-by-4 counter so that after every four frame start pulses, its output changes state. The output of divider 220 is supplied to illuminator 218 directly and to illuminator 102 through inverter 222. Thus, typically, illuminator 102 will be on first for four frames and then illuminator 218 will be on for four frames.

In this embodiment, the arc tangent data from ROM 152 is applied both to RAM 224 and the adding input of summer 226. For this embodiment, ROM 152 outputs a value between 0 and 1. RAM 224 is controlled by write signals from AND gate 228 and read signals from AND gate 230. The output of RAM 224 is applied to the subtracting input of summer 226. The output of summer 226 is applied to integer function generator 232, the output of which is applied to gate 234. The range image is simply the output of gate 234 and the output of RAM 224.

In operation, at the beginning of the first frame, the output of divider 220 is low so that illuminator 102 is actuated. The system illustrated in either FIG. 1 or FIG. 3 then collects data as described above from the three frames. In the fourth frame, as data is being read out and processed by ROM 152, the signal from inverter 222 and the signal from either AND gate 144 or 176 (depending on whether the FIG. 1 or FIG. 3 embodiment is being employed) is logically combined by AND gate 228 to produce a high signal. Accordingly, the data from ROM 152 is written into RAM 224 at an address related to the pixel from which the data was obtained. At the end of the fourth frame, RAM 224 is fully loaded with the high accuracy arc tangent data from ROM 152.

With the next frame start signal, the output of divider 220 becomes high, so that illuminator 218 is actuated. During the next three frames, data is collected in the manner described above with respect to either FIG. 1 or FIG. 3.

During the next frame, the second set of data is processed by ROM 152. This data is applied, one pixel at a time, to summer 226. Before it is applied to summer 226, it is multiplied by 8, the ratio of the spatial periods of the patterns projected by illuminators 102 and 218. This multiplication operation is accomplished simply by shifting the data by three bits in a conventional, well known fashion. As the data from each pixel is applied to summer 226, fine data from the corresponding pixel is read out from RAM 224 under control of AND gate 230. The fine data is subtracted from the coarse data in summer 226 and presented to integer function generator 232. Function generator 232 simply eliminates all digits to the right of the decimal (or more correctly, binary) point. Since gate 234 is actuated by the read control signal from AND gate 230, data from function generator 232 passes directly through gate 234 and forms the higher order bits of the range image data. The lower order bits are obtained directly from the high accuracy data stored in RAM 224. Thus, the resulting range image data includes both a large range in which no ambiguity exists and high accuracy simultaneously.

Figure 9:
FIG. 9 is a schematic illustration of the relationship between two periodic patterns which may be used simultaneously in an embodiment of the present invention.
Figure 10:
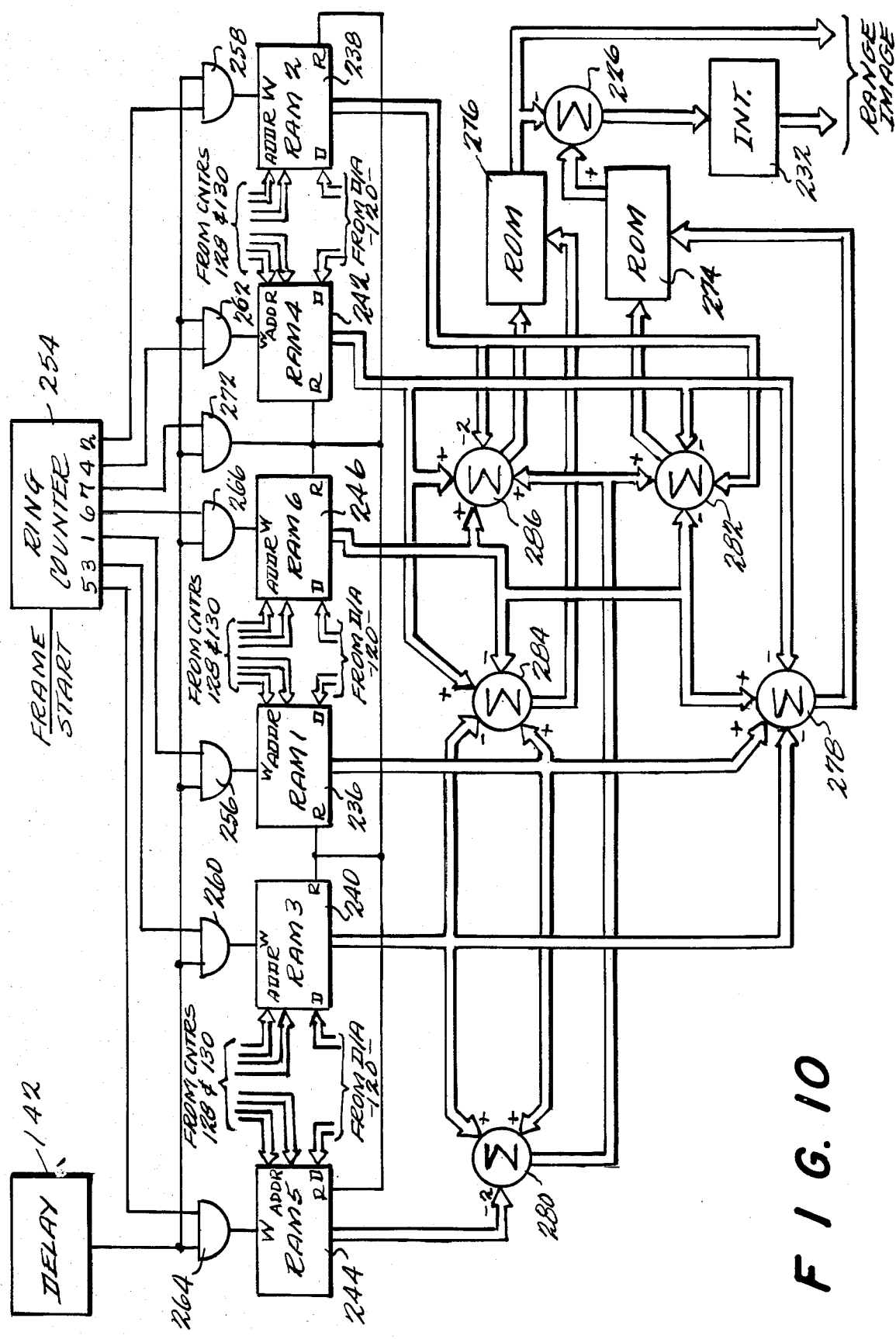
FIG. 10 is a diagram of another circuit to increase the range in which no ambiguity occurs.

An alternate approach is illustrated in FIGS. 9 and 10. In this embodiment, instead of employing two illuminators, a single illuminator projects a pattern consisting of the superposition of two periodic patterns of differing frequencies. In this embodiment, let us assume that one pattern has a period twice that of the other. Therefore, the range of no ambiguity is extended by a factor of two. Again, this range can be increased by adjusting the ratio of the periods of the patterns. Such patterns are illustrated in FIG. 9. An image which both has the larger range of no ambiguity and high accuracy can be obtained by monitoring the intensities during the first eight quarter cycle shifts of the high frequency pattern.

Thus, FIG. 10 represents a variation of the embodiment illustrated in FIG. 1. Data is provided to RAMs 236–246 from digital-to-analog converter 120 illustrated in FIG. 1. The addressing of RAMs 236–246 is controlled in a manner similar to the embodiment in FIG. 1 by counters 128 and 130.

Instead of a four output terminal ring counter employed in the embodiment in FIG. 1, the embodiment in FIG. 10 utilizes a seven step ring counter 254. Each of output terminals 1–6 is connected to the write control input of one of RAMs 236–246, respectively, through AND gates 256–266. The other input terminal of each of AND gates 256–266 is connected to delay circuit 142. The seventh output terminal of ring counter 254 is connected through AND gate 272 to the read control terminals of RAMs 236–246.

Thus, under control of ring counter 254, during the first six frames of scanning, intensity data is loaded into RAMs 236–246 in a manner identical to the loading of data in FIG. 1. During the seventh frame, data is read out from RAMs 236–246 and is processed by the remaining circuitry illustrated in FIG. 10.

Since both the high frequency and the low frequency patterns are varying simultaneously, it is necessary to eliminate the effect of variations in the high frequency pattern when coarse data is being obtained, and conversely, it is necessary to eliminate the effects of variations in the low frequency pattern when fine data is being obtained. The effects of each pattern on the other can be cancelled with the six frames of data that are collected. Specifically, it has been determined that if the following equations are employed to derive the phase data, the influences of each pattern on the other will be cancelled:

$$\text{Fine} = \arctan\left[ ((1) - 2(2) + (3) + (4) - 2(5) + (6))/\left(\sqrt{3}\,((1) - (3) + (4) - (6))\right)\right]$$

$$\text{Coarse} = \arctan\left[\left(\sqrt{3}\,((1) - (3) - (4) + (6))\right)/((1) + 2(2) + (3) - (4) - 2(5) - (6))\right]$$

The numbers in individual parentheses in the equations above refer to frames. Specifically, the numbers refer to the intensity data in the corresponding frames taken around the similarly numbered points in FIG. 9. The numbers not in individual parentheses are multiplication factors. Thus, the data from frames 1-6 are stored in RAMs 236-246, respectively. It is necessary to separately perform the calculations set forth above for each of the pixels in the frame.

These calculations occur as intensity data for each pixel is sequentially read out of RAMs 236-246 under control of ring counter 254 and counters 128 and 130. Read only memory 274 generates the coarse data and read only memory 276 generates the fine data. Each of ROMs 274 and 276 is addressed with the numerator and denominator of the above equations and the value that is read out from ROMs 274 and 276 represent the arc tangent of a factor of the quotient of the applied values. Thus, summer 278 produces the numerator of the coarse data by combining a positive form of frame one values, a negative form of frame three values, a negative form of frame four values and a positive form of frame 6 values. Summer 280 produces a sum which is useful in the denominator of the coarse data and the numerator of the fine data. Specifically, summer 280 produces a sum of positive values of frame one data, positive values of frame three data and negative values of twice the frame five data. The multiplication by two may be performed by simply shifting bits in a binary scheme to one higher place as is well known in the art.

The output of summer 280 is applied to summer 282 which combines the output of summer 280 with a negative form of frame six data, a negative form of frame four data and a positive form of twice the value of frame two data. The output of summer 282 is applied to ROM 274 as the denominator of the above coarse data equation.

Summer 284 generates the denominator for the fine data. Specifically, summer 284 combines a positive form of data from frame 1, a negative form of data from frame 3, a positive form of data from frame 4 and a negative form of data from frame 6. The output of summer 284 is applied as one address input of ROM 276.

Summer 286 combines the output of summer 280 with a negative form of twice the value of data from frame two, a positive form of data from frame 4 and a positive form of data from frame six. This sum is the numerator for the fine data and is applied also to ROM 276.

As with ROM 152 in the previous embodiments, ROMs 274 and 276 produce values between 0 and 1. As with the embodiment illustrated in FIG. 8, it is necessary to combine the outputs of ROMs 274 and 276 to produce a single range value which reflects both the increased range of no ambiguity and high accuracy. Accordingly, the outputs of ROMs 274 and 276 are applied to summer 226. Before being applied to summer 226, the output of ROM 274 is multiplied by 2 by shifting the data by one bit. The output of ROM 276 is applied to a subtracting input of summer 226. The resulting difference is applied to integer function generator 232 which eliminates digits to the right of the decimal (or more correctly, binary) point. The remaining value represents the most significant bits of the resulting image data. The least significant bits are obtained directly from ROM 276.

Although only a few exemplary embodiments of this invention have been described in detail above, those skilled in the art will readily appreciate that many modifications are possible in the exemplary embodiments without materially departing from the novel teachings and advantages of this invention. For example, those skilled in the art will readily appreciate that the addressing of the frame storing RAMs and the control of the read/write functions can be accomplished by a computer. In fact, the same computer could also take the output of the RAMs and perform the computation to generate the range data. If a computer is employed, those skilled in the art will realize that the circuitry and timing diagrams shown in the figures can easily be interpreted as flow charts to enable those skilled in the art to make and use this invention with a computer.

Accordingly, all such modifications are intended to be included within the scope of this invention as defined in the following claims.

What is claimed is:

1. Apparatus for imaging a scene comprising:
   means for illuminating said scene with a moving periodic modulation pattern;
   means, offset from said illuminating means, for converting light reflected from a plurality of points in said scene into electrical signals; and
   means for determining the relative phase with respect to said periodic modulation pattern of light reflected from each of said points in said scene using three of said electrical signals for each of said points generated at different times, said relative phase being related to the relative range of said points.

2. Apparatus as in claim 1 wherein said converting means includes an electronic camera.

3. Apparatus as in claim 1 wherein said determining means includes a computer responsive to said converting means.

4. Apparatus as in claim 1 wherein said illuminating means comprises:
   a source of light for illuminating said scene;
   a plate having a transmissiveness which varies with said periodic pattern in a first direction; and
   means for moving said plate along said first direction between said light source and said scene.

5. Apparatus as in claim 4 wherein said plate has transmissive regions separated by opaque regions in said direction.

6. Apparatus as in claim 1 wherein said illuminating means comprises:
   a source of light for illuminating said scene;
   a disk having a transmissiveness that varies with said periodic pattern circumferentially; and
   means for rotating said disk between said light source and said scene.

7. Apparatus as in claim 6 wherein said disk has transmissive regions separated by opaque regions in a circumferential direction.

8. Apparatus as in claim 1, wherein said periodic pattern has transmissive regions separated by opaque regions.

9. Apparatus as in claim 1 wherein said converting means integrates received light over a predetermined period of time.

10. Apparatus for creating an image of a scene, said image including a plurality of pixels, each pixel being associated with an area of said scene, said apparatus comprising:
    means for illuminating said scene with a moving periodic modulation pattern;

means, offset from said illuminating means, for generating intensity values for each of said pixels related to the amount of light reflected from said scene; and means for determining the relative phase with respect to said periodic modulation pattern of light reflected from each of said areas in said scene using three frames of said intensity values, said moving pattern having shifted in phase between consecutive ones of said three frames, said relative phase being related to the relative range of said areas.

11. Apparatus as in claim 10 further comprising means for summing said intensity values for each of said pixels, said sum being indicative of the intensity of light reflected from each of said pixels.

12. Apparatus for creating an image of a scene, said image including a plurality of pixels, each pixel being associated with an area of said scene, said apparatus comprising:

a source of light for illuminating said scene;
means, offset from the axis between said light source and said scene, for generating intensity values for each of said pixels related to the amount of light reflected from said scene;
means for modulating said light source to produce a moving, periodic pattern on said scene;
means for obtaining first, second and third frames of values from said generating means such that said moving pattern shifts in phase with respect to said pattern by one-third cycle between consecutive frames;
means for taking the difference between said values of each of said pixels in said first and third frames, and the difference between said values of each of said pixels in said second and third frames; and
means for determining the angle of the vector formed by said differences for each of said pixels, said angle being indicative of relative range.

13. Apparatus as in claim 12 wherein said obtaining means, taking means and determining means include a digital computer.

14. Apparatus as in claim 12 wherein said modulating means includes:

a disk having a transmissiveness that varies with said periodic pattern circumferentially; and
means for rotating said disk between said light source and said scene.

15. Apparatus as in claim 14 wherein said disk has transmissive regions separated by opaque regions in a circumferential direction.

16. Apparatus as in claim 12 wherein said periodic pattern has transmissive regions separated by opaque regions.

17. Apparatus as in claim 12 wherein said generating means integrates received light over a predetermined period of time.

18. Apparatus for creating an image of a scene, said image including a plurality of pixels, each pixel being associated with an area of said scene, said apparatus comprising;

a source of light for illuminating said scene;
means, offset from the axis between said light source and said scene, for generating intensity values for each of said pixels related to the amount of light reflected from said scene;
means for modulating said light source to produce a moving, periodic pattern on said scene;
first means for storing a first frame of said values;

second means for storing a second frame of said values;
third means for storing a third frame of values, said moving pattern having shifted in phase with respect to said pattern by 120° between consecutive frames;
first means for determining first difference values related to the differences between said intensity values for each of said pixels in said first and third frames;
second means for determining second difference values related to the differences between said intensity values for each of said pixels in said second and third frames; and
means for determining the arc tangent of a value related to the quotient of the sum of said first and second difference values and the difference of said first and second difference values for each of said pixels, said arc tangent being indicative of relative range.

19. Apparatus as in claim 18 further comprising means for summing said intensity values for each of said pixels, said sum being indicative of the intensity of light reflected from each of said pixels.

20. Apparatus as in claim 18 wherein said first difference determining means, said second difference determining means and said arc tangent determining means include a digital computer.

21. Apparatus as in claim 18 wherein said modulating means includes:

a disk having a transmissiveness that varies with said periodic pattern circumferentially; and
means for rotating said disk between said light source and said scene.

22. Apparatus as in claim 21 wherein said disk has transmissive regions separated by opaque regions in a circumferential direction.

23. Apparatus as in claim 21 wherein:
said disk has a transmissiveness that varies circumferentially with two periodic, superimposed patterns, one of said patterns having a frequency higher than the other said patterns; and
said apparatus includes means for generating relative coarse and fine range data.

24. Apparatus as in claim 18 further comprising:
second means for modulating said light source, said second modulating means producing a periodic pattern having a lower frequency than said modulating means; and
means, responsive to intensity values while said second modulation means is actuated, for producing coarse, relative range data.

25. Apparatus as in claim 18 wherein said moving periodic pattern shifts one complete cycle for every three frames of intensity values generated by said generating means.

26. Apparatus for creating an image of a scene, said image including a plurality of pixels, each pixel being associated with an area of said scene, said apparatus comprising:

a source of light for illuminating said scene;
means, offset from the axis between said light source and said scene, for generating intensity values for each of said pixels related to the amount of light reflected from said scene;
means for modulating said light source to produce a moving, periodic pattern on said scene; first means for storing a frame of said values;

second means for storing a frame of said values;

control means for causing (1) a first frame of said values to be stored in said first storing means, (2) a second frame of said values to be stored in said second storing means, and (3) said values in said first and second storing means to be read out and subtracted from corresponding pixels in a third frame, the differences being stored in said first and second storing means, said moving pattern having shifted in phase with respect to said pattern by 120° between consecutive frames; and means for determining the arc tangent of a value related to the quotient of the sum of said first and second difference values and the difference of said first and second difference values for each of said pixels, said arc tangent being indicative of relative range.

27. Apparatus as in claim 26 wherein said periodic pattern has transmissive regions separated by opaque regions.

28. Apparatus as in claim 26 wherein:

said modulating means includes means for modulating said light source to produce two moving periodic patterns on said scene, one of said periodic patterns having a frequency greater than the other periodic pattern; and said apparatus includes means for generating relative coarse and fine range data.

29. Apparatus as in claim 26 wherein said generating means includes an electronic camera.

30. Apparatus as in claim 26 wherein said control means and said determining means includes a digital computer.

31. Apparatus as in claim 26 wherein said moving periodic pattern shifts one complete cycle for every three frames of intensity values generated by said generating means.

32. A method for imaging a scene comprising the steps of:

illuminating said scene with a moving periodic modulation pattern;

monitoring the intensity of light reflected from a plurality of points in said scene from an angle offset from the axis of illumination; and determining the relative phase with respect to said periodic modulation pattern of light reflected from each of said points in said scene using three light intensities from said monitoring step for each of said points monitored at different times, said relative phase being related to the relative range of said points.

33. A method as in claim 32 wherein said monitoring step includes the step of integrating said reflected light over a predetermined time.

34. A method for creating an image of a scene, said image including a plurality of pixels, each pixel being associated with an area of said scene, said method comprising the steps of:

illuminating said scene with a moving periodic modulation pattern;

monitoring the intensity of light reflected from said scene for each of said pixels at an angle offset from the axis of illumination; and determining the relative phase with respect to said periodic modulation pattern of light reflected from each of said areas in said scene using three intensity values for each of said pixels monitored at different phase positions of said periodic modulation pattern, said relative phase being related to the relative ranges of said areas.

35. A method as in claim 34 further comprising the step of summing said intensity values for corresponding pixels, said sum being indicative of the intensity of light reflected from each of said pixels.

36. A method for creating an image of a scene, said image including a plurality of pixels, each pixel being associated with an area of said scene, said method comprising the steps of:

illuminating said scene with a moving periodic modulation pattern;

monitoring the amount of light reflected from said scene for each of said pixels at an angle offset from the illumination axis;

obtaining first, second and third sets of intensity values for each of said pixels, said moving pattern having shifted in phase by one-third cycle between the monitoring of each of said sets of values;

subtracting said values of each of said pixels in said third set from said first set, and subtracting said values of each of said pixels in said third set from said second set; and determining the angle of the vector formed by the results of said subtracting steps for each of said pixels, said angle being indicative of relative range.

37. A method as in claim 36 wherein said monitoring step includes the step of integrating said reflected light over a predetermined period of time.

38. A method for creating an image of a scene, said image including a plurality of pixels, each pixel being associated with an area of said scene, said method comprising the steps of:

illuminating said scene with a moving periodic modulation pattern;

monitoring the intensity of light reflected from said scene for each of said pixels at an angle offset from the axis of illumination;

storing a first frame of values in a first memory;

storing a second frame of values in a second memory;

reading out values stored in said first memory and subtracting intensity values of corresponding pixels of a third frame from intensity values of said first frame as intensity values for said third frame are being monitored;

reading out intensity values stored in said second memory and subtracting intensity values of corresponding pixels in said third frame from intensity values of said second frame as intensity values for said third frame are being monitored;

said moving pattern having shifted in phase by one-third cycle between consecutive frames; and determining the arc tangent of a value related to the quotient of the sum and differences of the results of said subtracting steps for each of said pixels, said arc tangent being indicative of relative range.

39. A method as in claim 38 wherein:

said illuminating step includes the step of illuminating said scene with first and second moving periodic modulation patterns, said first and second modulation patterns moving at different frequencies and having different periods; and said method further comprises the step of processing frames of intensity values to obtain coarse and fine range data.

40. A method as in claim 38 wherein said pattern shifts one complete cycle for every three frames of intensity values monitored in said monitoring step.

* * * * *